United States Patent
Rajani et al.

(10) Patent No.: US 9,880,773 B2
(45) Date of Patent: Jan. 30, 2018

(54) NON-HOMOGENEOUS DISK ABSTRACTION FOR DATA ORIENTED APPLICATIONS

(71) Applicant: VMware, Inc., Palo Alto, CA (US)

(72) Inventors: Vineet Rajani, Bangalore (IN); Nagendra S. Tomar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 214 days.

(21) Appl. No.: 13/851,828

(22) Filed: Mar. 27, 2013

(65) Prior Publication Data

US 2014/0297941 A1    Oct. 2, 2014

(51) Int. Cl.
  *G06F 13/12*    (2006.01)
  *G06F 3/06*    (2006.01)
  *G06F 9/455*    (2006.01)

(52) U.S. Cl.
  CPC .......... *G06F 3/0644* (2013.01); *G06F 3/0605* (2013.01); *G06F 3/0659* (2013.01); *G06F 3/0664* (2013.01); *G06F 3/0665* (2013.01); *G06F 3/0685* (2013.01); *G06F 9/45558* (2013.01); *G06F 2009/45579* (2013.01)

(58) Field of Classification Search
  None
  See application file for complete search history.

(56) References Cited

U.S. PATENT DOCUMENTS

| | | | |
|---|---|---|---|
| 6,976,134 B1* | 12/2005 | Lolayekar et al. | 711/148 |
| 2002/0069324 A1* | 6/2002 | Gerasimov et al. | 711/114 |
| 2008/0162735 A1* | 7/2008 | Voigt et al. | 710/6 |
| 2008/0244577 A1* | 10/2008 | Le et al. | 718/1 |
| 2009/0193218 A1* | 7/2009 | Tamura et al. | 711/170 |
| 2011/0173608 A1* | 7/2011 | Buragohain et al. | 718/1 |

* cited by examiner

*Primary Examiner* — Duc Doan

(57) ABSTRACT

One embodiment of the system described herein facilitates a virtualized heterogeneous disk that supports differentiated storage service qualities. During operation, the system mounts a plurality of partitions of a heterogeneous disk at different mount points, each mount point corresponding to a level of quality of service (QoS). The system then receives a write command and identifies a QoS level indication associated with the write command. Subsequently, the system selects a partition on the heterogeneous disk with performance parameters matching the identified QoS level and writes data to the selected partition. The heterogeneous disk is an abstraction of a plurality of virtualized storage devices. Furthermore, the heterogeneous disk has a single block address space, and the virtualized storage devices are allowed to have differentiated performance parameters, thereby facilitating differentiated QoS levels in the heterogeneous disk.

24 Claims, 9 Drawing Sheets

NON-HOMOGENEOUS DISK ABSTRACTION FOR DATA ORIENTED APPLICATIONS

BACKGROUND

Recent advances in virtualization and data-center technologies have made cloud-based applications a viable option for both personal and enterprise computing. Cloud-based applications such as Google® Docs and Microsoft SkyDrive® often have different demands for the underlying storage devices, which may vary with the type of documents involved, services rendered, or users served by these applications. Such demands are becoming common requirements for cloud services, which often need to satisfy storage service level agreements (SLAs) requested by customers. However, at present, data centers often store data on disks in a manner that only optimizes a few primitive parameters such as disk utilization and seek time, without consideration of SLA requirements.

For example, while a storage system can store log files on standard rotational media (e.g., conventional hard disks), some documents might need the extra redundancy of a redundant array of independent disk (RAID) storage, and other documents may need faster access from a solid-state drive (SSD). A database may require fast and random access to a file, whereas a backup application can afford to access data more slowly in a sequential manner. Thus, applications may have different requirements with respect to storage devices. However, current cloud services do not distinguish between the different access patterns of different types of applications. An administrator might manually configure storage of a certain quality level for an application. However, manual configuration is costly and cannot respond quickly to changing application SLA requirements.

SUMMARY

One embodiment of the system described herein facilitates a virtualized heterogeneous disk that supports differentiated storage service qualities. During operation, the system mounts a plurality of partitions of a heterogeneous disk at different mount points, each mount point corresponding to a level of quality of service (QoS). The system then receives a write command and identifies a QoS level indication associated with the write command. Subsequently, the system selects a partition on the heterogeneous disk with performance parameters matching the identified QoS level and writes data to the selected partition. The heterogeneous disk is an abstraction of a plurality of virtualized storage devices. Furthermore, the heterogeneous disk has a single block address space, and the virtualized storage devices are allowed to have differentiated performance parameters, thereby facilitating differentiated QoS levels in the heterogeneous disk.

DETAILED DESCRIPTION

Figure 1:
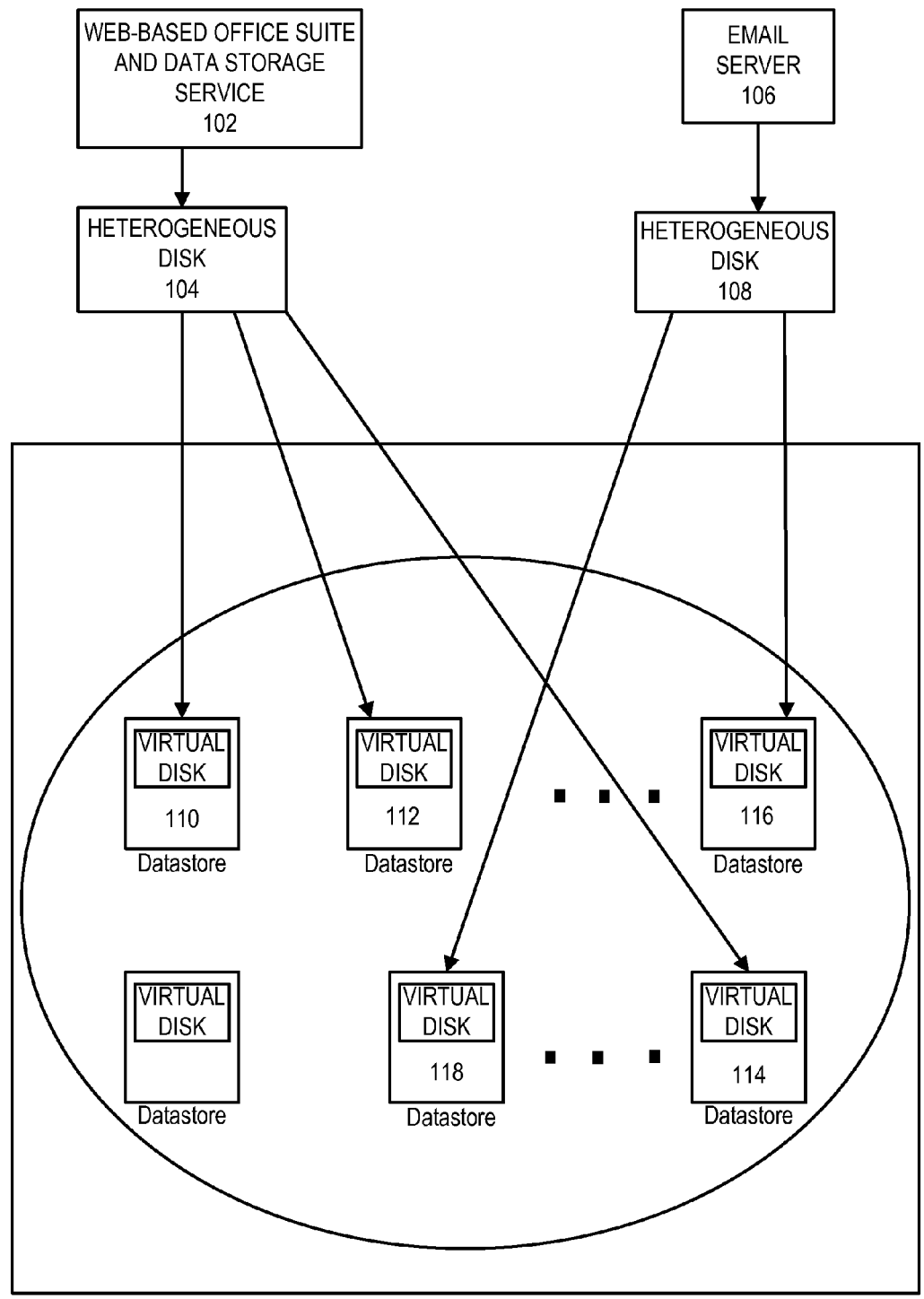
FIG. 1 illustrates an exemplary heterogeneous disk.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Embodiments of the system described herein solve the problem of meeting different storage SLAs demanded by applications running on virtual machines by introducing, into a hypervisor, a virtual, distributed, non-homogeneous disk represented by a storage abstraction layer. This storage abstraction layer brokers the underlying storage resources with different (i.e., heterogeneous) quality of service (QoS) levels to guest operating systems. In some embodiments, this storage abstraction layer can map a particular storage resource with a given set of QoS parameters to a disk partition mounted at a specific mount point according to an application's SLA needs.

In embodiments of the system described herein, a storage abstraction layer provides access to a heterogeneous disk which can include storage devices residing in datastores at different locations, each datastore having QoS parameters matching a particular QoS class. A datastore is a logical container for files (e.g., partition on a disk or storage volume with logical unit number (LUN), which, in one embodiment, can be formatted with VMware®'s Virtual Machine File System (VMFS) file system). A datastore can be local, e.g., a server's hard drive, or remote, e.g., a storage device attached to a storage area network (SAN). In this disclosure, the term "heterogeneous disk" generally refers to the data storage aspects of the storage abstraction layer and the term "heterogeneous disk layer" generally refers to the storage management aspects of the storage abstraction layer, although these terms may also be used interchangeably.

Generally, a heterogeneous disk can include multiple virtual or actual storage devices located at different datastores and typically on heterogeneous storage media. A virtual storage device can be, for example, a Virtual Machine Disk Format (VMDK) disk. VMDK is a file format used for virtual machines and mimics the operation of a physical disk. In some embodiments, a respective virtual disk has a virtual volume (e.g., VMware® Virtual Volume), which is a storage architecture that allows management of virtual machine storage at the virtual machine level, instead of the LUN/volume level. Note that in virtual machines, a hypervisor virtualizes the underlying physical storage device into one or more virtual disks. The heterogeneous disk layer disclosed herein adds another level of abstraction.

In a typical use case, an administrator initially obtains a heterogeneous disk of a certain size (e.g., adding a local physical storage device, or purchasing a storage space provided by a storage service provider over a network), and adds the heterogeneous disk to a virtual machine (guest)

operating system via the hypervisor. The heterogeneous disk appears to be a standard virtual disk to the guest operating system, and the administrator can create one or more partitions on the heterogeneous disk. Compared with a conventional virtual disk, a partition created on a heterogeneous disk corresponds to a particular set of SLA parameters, which facilitates the differentiation of different QoS levels. The administrator can mount a partition associated with a QoS level at a particular mounting point. For example, there can be three QoS levels, labeled as "gold," "silver," and "bronze," respectively. Accordingly, the administrator can mount a partition of the heterogeneous disk at /mnt/gold/, /mnt/silver/, or /mnt/bronze/, depending on the QoS parameters of that partition (which reflects the QoS parameters of the underlying storage device). An application can therefore choose a partition with the appropriate QoS level, based on the application's SLA, to store data.

Although in the examples described herein the heterogeneous disk layer offers three QoS levels, any number of QoS levels is possible, and the administrator can define these QoS levels in different ways via the heterogeneous disk layer. The parameters for a QoS level may include multiple performance dimensions, including availability, redundancy, security and/or speed. One criterion for measuring datastore performance is Input/Output Operations Per Second (IOPS). IOPS is a performance measurement for computer storage devices like hard disk drives (HDD), solid state drives (SSD), and storage area networks (SAN). For example, the "gold" QoS level may require IOPS>1000, the "silver" level may require 500-1000 IOPS, and the "bronze" level may require IOPS<500. For a respective QoS level, the administrator may specify a QoS profile that satisfies an SLA and specifies a number of QoS parameters. For example, the "gold" level may require fast disk access but low redundancy, while the "silver" level may require high redundancy but can tolerate slower access times.

Another feature of the heterogeneous disk layer is that it allows the heterogeneous disk to only allocate physical storage space of each QoS level on demand. For example, if a file in partition mounted to /mnt/gold/ expands, and requires more blocks, the heterogeneous disk layer can request blocks with a "gold" QoS level from a back-end datastore of gold QoS level (e.g., an SSD). Note that the complexity of the storage allocation details can be transparent to the administrator, providing a simple interface for the administrator to allocate data storage of various service levels.

This allocation-on-demand feature can facilitate a pay-as-you-grow model which can be valuable for customers. For example, when an administrator purchases a heterogeneous disk of a fixed size, the administrator can pay for only the storage capacity that is actually used (e.g., according to a pay-per-use model), since the fixed size represents only the upper bound on the storage capacity. The administrator can pay for storage expenses for each service level as the storage requirements expand (and reduce storage expenses when storage demand is reduced). For example, an administrator can purchase 100 GB of gold-level heterogeneous disk. The 100 GB represents the upper bound on the expected maximum used storage, and the administrator can pay only for the actual used storage space within 100 GB.

Note that the heterogeneous disk may also support functions such as cloning, taking a snapshot, converting the heterogeneous disk to a normal virtual disk (i.e., without SLA guarantees), and restriction of an SLA to below a certain threshold. Further, the storage abstraction layer on top of the virtual volumes provides a pluggable model for inserting filters for security, encryption, replication, etc.

FIG. 1 illustrates an exemplary heterogeneous disk. In this example, different cloud applications use heterogeneous disks, each of which is a virtualized, logical disk, to store and manage data. A Web-based office suite and data storage service 102 uses a heterogeneous disk 104 to store and manage data. An e-mail server 106 also uses a heterogeneous disk 108 to store and manage data. The heterogeneous disk abstraction hides the underlying complexity of data management, distribution, free space management, disk location maintenance, etc., and presents a unified address space. The cloud applications interface with heterogeneous disks 104, 108 as conventional disks, although heterogeneous disks 104, 108 are not conventional disks. Each of heterogeneous disks 104, 108 stores data on one or more datastores. For example, heterogeneous disk 104 stores data in datastores 110, 112, and 114. Also, heterogeneous disk 108 can store data in datastores 116 and 118. Each datastore can be an SSD, RAID, rotational device (e.g., hard drive), tape drive, or any type of data storage device. Note that such datastores can also be located remotely from the hosts on which the applications run.

Note that the terms "virtual volume" and "virtual disk" are interchangeable in this disclosure. Any technique discussed in this disclosure based on a virtual disk is also applicable to a virtual volume, and vice versa. In addition, datastores have the capability to expose parameters such as guaranteed IOPS, availability, replication, and type of data source (e.g., SSD, rotational, RAID) to a centralized platform for managing virtual infrastructure (e.g., VMware® vCenter Server). One example is VMware's vStorage APIs for Storage Awareness (VASA)-enabled datastores. With such capabilities, the virtual volumes facilitate advanced capabilities such as taking a snapshot of the current state of the virtual machine at the virtual disk level, instead of the LUN level. In one implementation, all the accessed datastores can be VASA-enabled datastores.

Figure 2:
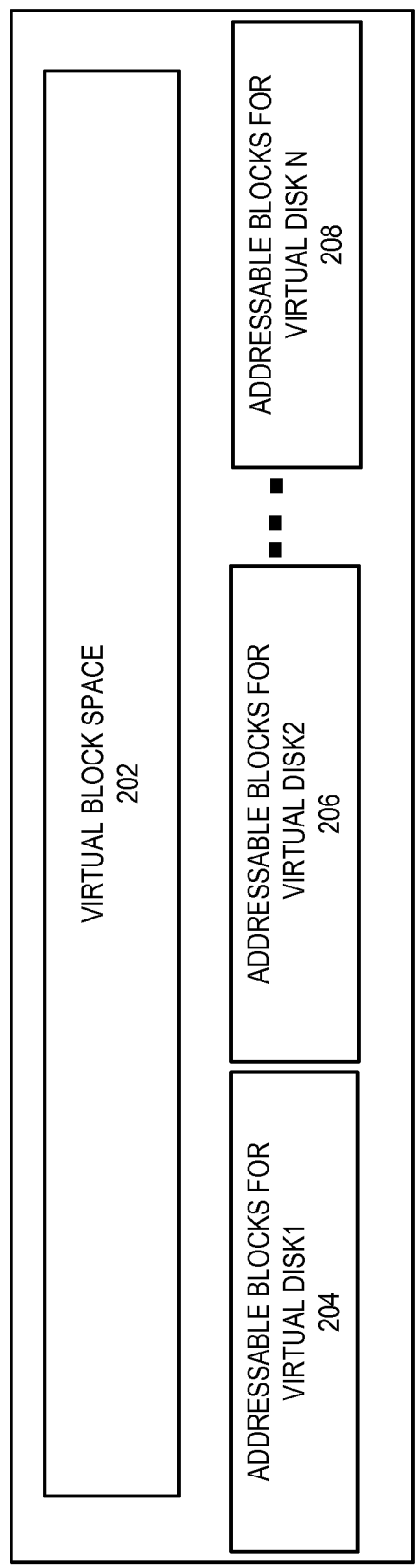
FIG. 2 illustrates an exemplary unified virtual block space.

Although a heterogeneous disk may include various virtual disks, to an application the heterogeneous disk presents a unified virtual block space, as illustrated in FIG. 2. In this example, heterogeneous disk 104 presents a unified virtual block space 202 to applications. Heterogeneous disk 104 internally manages the complexity of allocating new data blocks on the appropriate virtual volume/virtual disk matching the demanded SLA. For example, heterogeneous disk 104 may allocate blocks corresponding to blocks in one of three virtual disks, which contain addressable blocks 204, 206, and 208, respectively.

Figure 3:
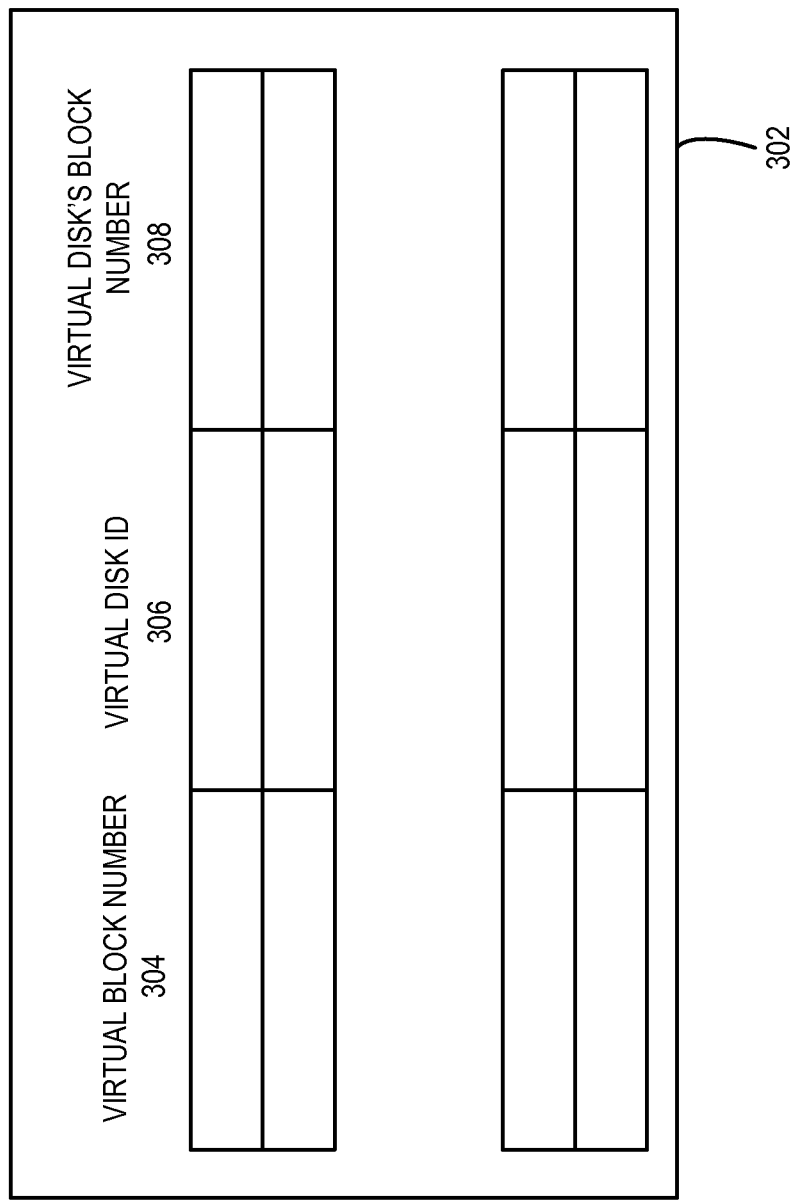
FIG. 3 illustrates an exemplary disk address table.

To facilitate the unified virtual block space, a hypervisor can map a respective virtual block to a block in a particular virtual disk using, for example, a disk address table. FIG. 3 illustrates an exemplary disk address table 302 which includes three columns: a virtual block number column 304, a virtual disk ID column 306, and a virtual disk's block number column 308. Disk address table 302 maintains mappings between virtual block numbers in the heterogeneous disk's virtual block space and the virtual disks' block numbers, thereby providing a lookup infrastructure for the heterogeneous disk layer to choose the appropriate virtual disk for an application. Virtual block number column 304 stores information indicating a block number in virtual block space 202. Virtual disk ID column 306 and virtual disk's block number column 308 indicate the corresponding virtual disk and the block on the virtual disk. The heterogeneous disk layer can add new entries to disk address table 302 in response to I/O operations, and subsequent I/O operations are also mapped through disk address table 302. Note that the hypervisor can store disk address table 302 in various formats such as hash table, B-tree, etc.

Note that blocks of a partition can actually reside on multiple virtual disks that are of the same quality of service, and the mappings for spanning the partition data across multiple virtual disks are stored in disk address table 302. For example, heterogeneous disk layer may allocate a first block on virtual disk #1, and allocate a second block on virtual disk #2. The virtual disk ID of virtual disk #1 and the virtual disk ID of virtual disk #2 may be stored in the virtual disk ID 306 field, while their respective block numbers may be stored in the virtual disk's block number 308 field. Thus, a partition and the partition's files may be spread across multiple virtual disks and mappings of the partition's blocks to the virtual disks' blocks are stored in disk address table 302.

Figure 4:
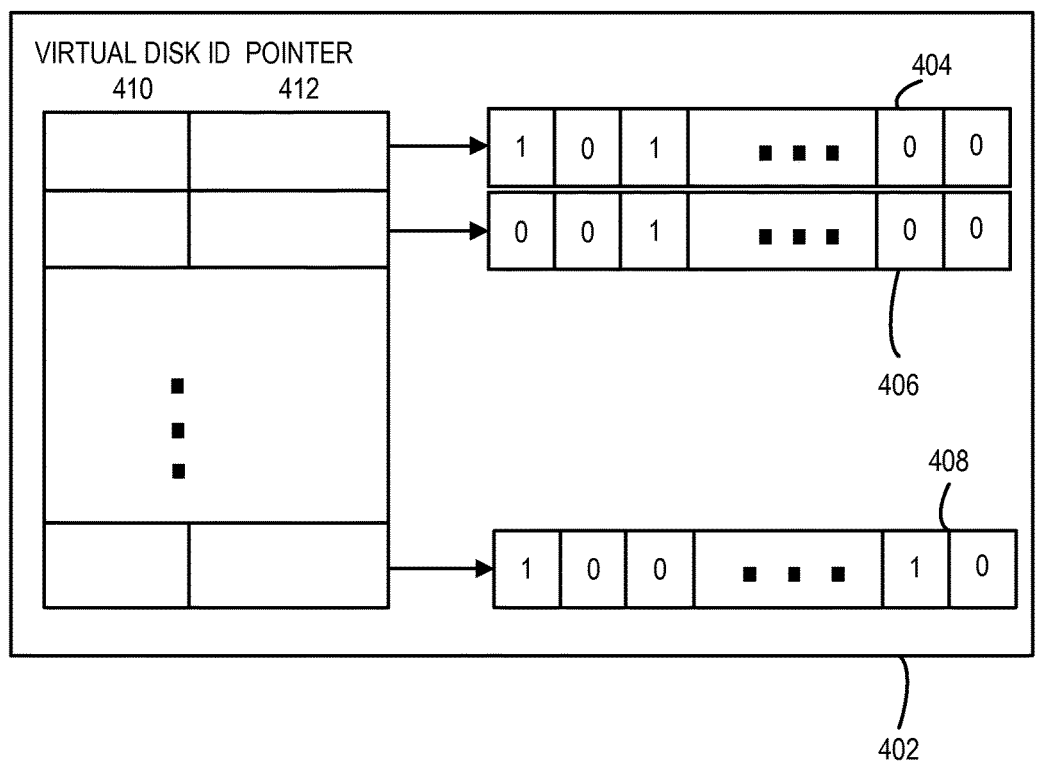
FIG. 4 illustrates an exemplary distributed free block table.

As applications on a virtual machine continuously create and delete files from the heterogeneous disk, it is important to keep track of the free space available on the heterogeneous disk. In one embodiment, each virtual disk keeps track of its free space by storing a bit vector in its superblock. Note that a superblock is a segment of metadata that contains information about a file system, including data such as the file system type, size, status, and other information. The heterogeneous disk layer can query the virtual disks for the free-block bit vector, and maintain a data structure, such as a distributed free block table, to store the bit vectors for the virtual disks. FIG. 4 illustrates an exemplary distributed free block table 402 with free-block bit vectors corresponding to the virtual disks that are part of the heterogeneous disk. Distributed free block table 402 may include a virtual disk ID column 410 and a pointer column 412. A virtual disk ID in column 410 identifies a virtual disk, and a corresponding pointer in column 412 points to a corresponding bit vector that indicates free blocks in that virtual disk. In the example in FIG. 4, bit vectors 404, 406, 408 each indicate the free blocks in a corresponding virtual disk. For example, bit vector 404 may indicate free blocks in virtual disk 110. In one embodiment, a bit vector stores a "1" in at a bit position corresponding to a block when that block is free, and stores a "0" if that block is not free.

The heterogeneous disk layer may update distributed free block table 402 (e.g., by changing a particular bit of a free-block bit vector) each time a block is allocated in a virtual disk. Furthermore, heterogeneous disk 104 can use distributed free block table 402 to quickly search for a free block and allocate the free block on a virtual disk. Generally, the aforementioned storage abstraction layer (i.e., the heterogeneous disk layer) can reside inside a hypervisor. In one embodiment, the heterogeneous disk layer can reside in a file device switch (FDS) layer within a hypervisor, and can act as an SLA based multiplexing device for the underlying virtual disks. In addition, the FDS layer can perform operations such as disk management and free space management.

In one embodiment, the state of a heterogeneous disk, which includes the block address map and the free space bit vector, is serialized and persisted into a descriptor disk. There is a separate descriptor disk for each heterogeneous disk which a hypervisor provisions. On reboot, a hypervisor reads the descriptor disks and deserializes these data structures to reconstruct the corresponding heterogeneous disk.

Figure 5:
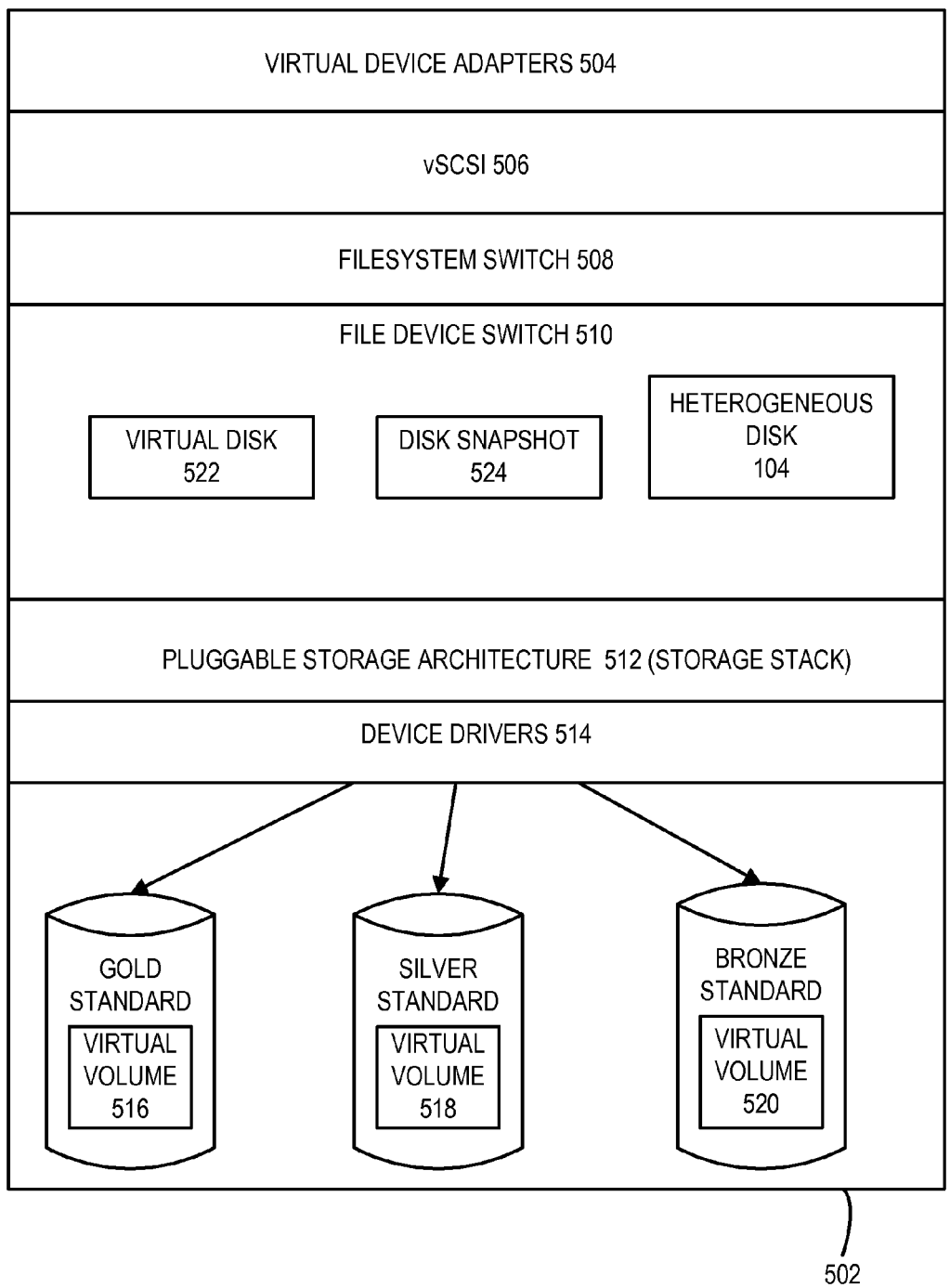
FIG. 5 illustrates an exemplary placement of a heterogeneous disk layer in a hypervisor.

FIG. 5 illustrates an exemplary placement of a heterogeneous disk layer in a hypervisor. In this example, a hypervisor 502 (e.g., VMware® ESX hypervisor) includes various layers such as virtual device adapters 504, a virtual SCSI (vSCSI) driver 506, a files system switch 508, a file device switch 510, pluggable storage architecture (storage protocol stack) 512, device drivers 514, and virtual volumes 516, 518, and 520. File system switch layer 508 provides a set of interfaces for upper-layer applications to perform file I/O over a diverse set of file systems. File device switch layer 510 provides abstractions for various virtualized storage devices, such as a virtual disk 522 (as used by conventional virtual machines), a disk snapshot 524, and a heterogeneous disk 104. File device switch layer 510 performs services such as disk management and free space management. Pluggable storage architecture layer 512 (storage protocol stack) provides code for interfacing with the actual hardware via device drivers 514. Heterogeneous disk 104 routes disk read and write commands to the appropriate virtual volumes based on SLAs. Virtual volume 516 complies with the SLA "gold" standard, virtual volume 518 complies with the silver, and virtual volume 520 is the bronze standard.

Note that although in the example in FIG. 5 heterogeneous disk 104 resides in file device switch 510 layer, it can also reside in other layers in different embodiments. For example, in a Linux operating system, heterogeneous disk 104 may reside in a device mapper layer.

The addition of a heterogeneous disk to a guest OS is similar to the process of adding a normal virtual disk (e.g., a VMDK disk). In a typical use case, a user having purchased a heterogeneous disk attaches it to a guest OS. The heterogeneous disk appears like a normal virtual disk to the guest OS and the user is free to create partitions and perform operations on it like those performed on any other existing disk. The user is not required to specify apriori the SLA level (i.e., gold, silver, or bronze) of the heterogeneous disk, which allows the user to adjust the allocations on an as-needed basis.

Figure 6:
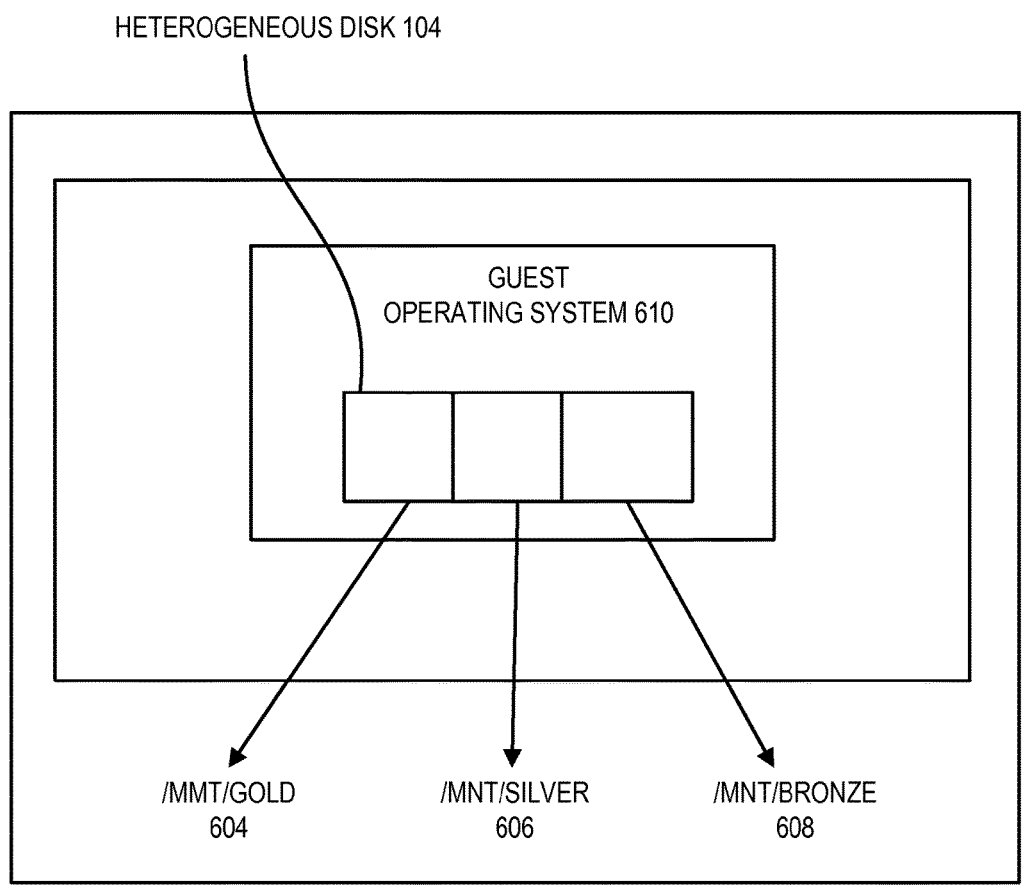
FIG. 6 illustrates an exemplary heterogeneous disk with three partitions added to a guest operating system.

In order to make the heterogeneous disk usable, the guest OS typically partitions it as per its needs and formats the partition with a file system. Subsequently, the guest OS mounts a respective partition with a mount flag which specifies the SLA level. The guest OS also mounts a partition with a specific SLA level at a corresponding special mount point, like /mnt/gold, /mnt/silver, or /mnt/bronze. FIG. 6 illustrates an exemplary heterogeneous disk with three partitions added to a guest operating system. In FIG. 6, a guest operating system 610 partitions and formats heterogeneous disk 104 into three partitions 604, 606, and 608, according to the applications' SLA requirements. Guest OS 104 then mounts each partition with a special mount flag specifying the corresponding SLA level. Assuming that partition 604 is at the gold level, 606 at the silver level, and 608 at the bronze level, guest OS 104 mounts these partitions at /mnt/gold, /mnt/silver, and /mnt/bronze, respectively. The SLA level information indicated by the mount flag persists in the superblock of each partition.

During an I/O write process, the file system transforms the file write command into a block level SCSI write command before sending it to the disk. The SCSI command descriptor block (CDB) conveys as some QoS flags the SLA level information retained in the file system superblock of the disk partition in the guest. Note that the CDB is a block of information that describes the command (e.g., SEEK command or WRITE command). The CDB typically includes a one byte operation code (opcode) followed by five or more bytes containing command-specific parameters. A SCSI CDB may include one or more QoS flags read from the superblock of the file system. Subsequently, the heterogeneous disk at the hypervisor layer interprets the CDB and performs the write operation on the appropriate virtual volume with the correct SLA level. Once the hypervisor writes the data to the virtual disk with the correct SLA level, I/O read operations can automatically satisfy the SLA since the data is stored in the appropriate storage device that satisfies the SLA.

Figure 7:
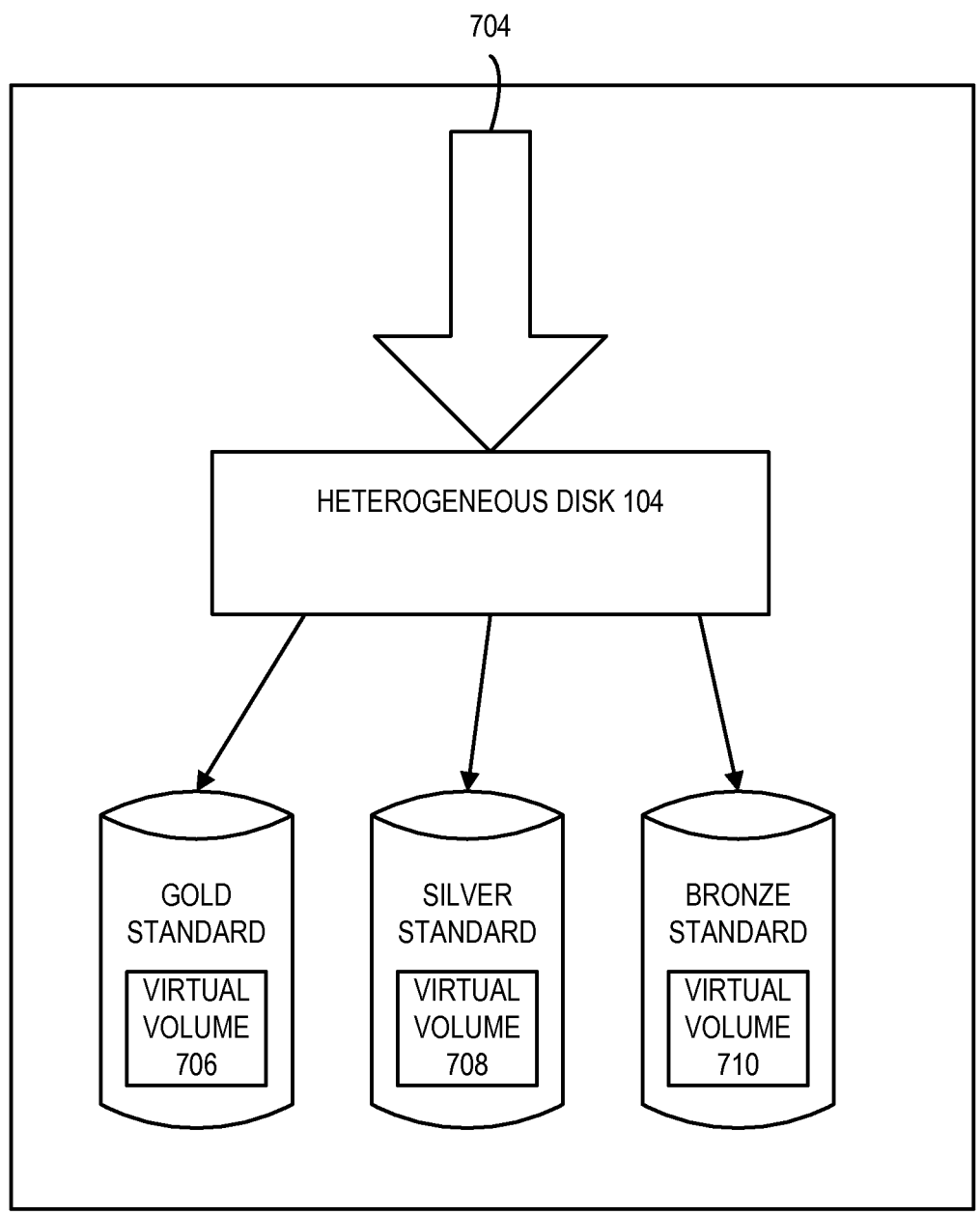
FIG. 7 illustrates exemplary input/output for a heterogeneous disk.

FIG. 7 illustrates exemplary I/O operations on a heterogeneous disk. In FIG. 7, heterogeneous disk 104 receives SCSI CDB 704 from the file system. Heterogeneous disk 104 then retrieves the SLA level information from the CDB and directs the I/O write request to the appropriate virtual volume with the matching SLA level. For example, heterogeneous disk 104 may send the I/O write request to a virtual volume 706 for the gold service level. Other possible service levels are silver (e.g., virtual volume 708), and bronze (e.g., virtual volume 710).

Figure 8:
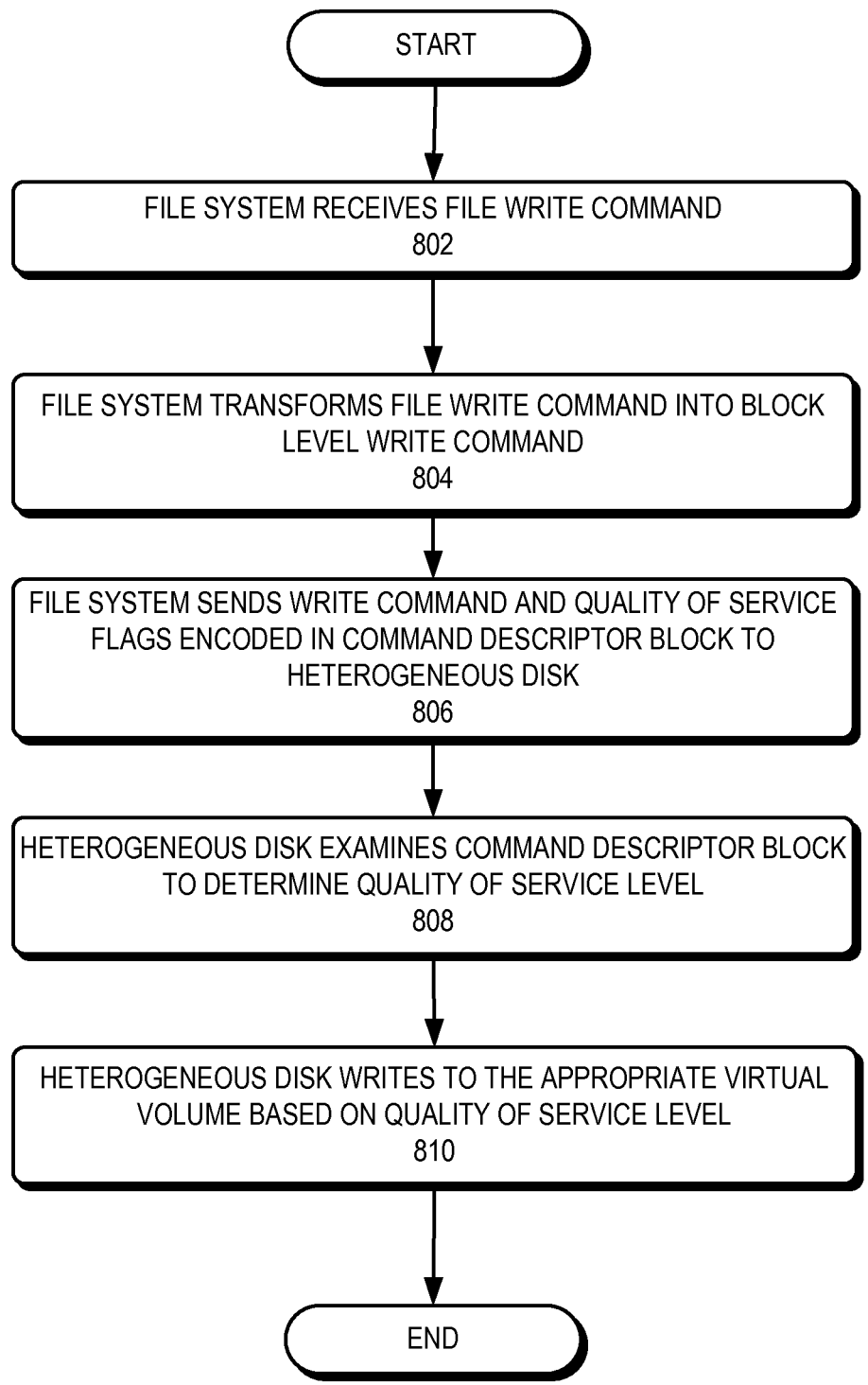
FIG. 8 presents the sequence of steps taken on the success path of a write operation issued by a guest.

FIG. 8 presents the sequence of steps taken on the success path of a write operation issued by the guest. During operation, the file system initially receives a file write command (e.g., from an application executing within the guest operating system) (operation 802). The file system then transforms the file write command into a block level write command (e.g., SCSI write command) (operation 804). Next, the file system sends QoS flags and the write command to the heterogeneous disk (operation 806). The file system conveys the SLA level information as QoS flags in a field of a SCSI CDB for a WRITE command. Subsequently, the heterogeneous disk layer (e.g., at the hypervisor) examines the CDB to determine the QoS level (operation 808). The heterogeneous disk then writes to the appropriate virtual volume based on the QoS level (operation 810).

For example, to comply with the SLA for a service provider, for a gold level file system, heterogeneous disk 104 only selects SSD storage to allocate blocks. Note that for the read operation the file system does not need to convey any extra QoS information, since heterogeneous disk 104 only needs to determine where the blocks are stored and retrieve the data stored in the blocks.

In one illustrative example, Company A offers a file hosting service that allows users to upload and synchronize files to a cloud storage. The files can be accessed from a Web browser or a local device. The file hosting service may use the heterogeneous disk as the storage infrastructure. Consumers can choose between gold, silver, and bronze SLAs for different storage options. The price per unit storage can vary among the different service levels.

Scenario 1: SLA-based application for storing documents. Assume that a content management company AB Corporation agrees to rent, from Company A, 100 GB of space on the file hosting service on a metered (e.g., pay-per-use) basis. Company A charges AB Corporation for the amount of storage actually used and not for reserving 100 GB. The charges are based on the SLA guarantees provided to AB Corporation by Company A (e.g., higher SLA guarantees cost more). Depending on observed usage patterns, AB Corporation may choose to have a gold level SLA for heavily accessed documents and the bronze level SLA for other documents accessed less often. AB Corporation divides the 100 GB space into two partitions, 30 GB and 70 GB each, and specifies the file system mount options corresponding to gold and bronze level SLAs, respectively. At this point no actual storage has been allocated, even the act of file system creation on these partitions only writes the required metadata as opposed to preallocating 100 GB of space ahead of time. The actual storage blocks are allocated only when the guest has actually issued writes. This lazy allocation approach naturally lends itself to a pay-as-you-go model, as the client only needs to pay for what he/she has actually used as opposed to the whole 100 GB.

Scenario 2 (Responding to change in demands): Now, assume AB Corporation at some later time realized that some of the documents on the gold storage are no longer as important as they used to be and decides to move it off to a different storage of lower SLA. The act of deleting files from the file system in the guest automatically results in the corresponding TRIM/UNMAP commands in the heterogeneous disk layer, thus providing a smooth and unobtrusive migration of data in the guest. Apart from just specifying the appropriate QoS flag at the time of mounting the file system, the rest of the read/write cycle remains unchanged for the guest. All the complexity of choosing and mapping the writes to the appropriate disk of appropriate QoS level is handled by the heterogeneous disk layer while keeping the guest oblivious of the heterogeneous disk layer's existence.

The two scenarios above exemplify use cases for a SLA-based storage allocation in which the application is directly requesting different SLAs on the heterogeneous disk. The scenarios also highlight the importance of this new storage model wherein the data storage is governed by the SLA requirements of the application rather than by system controlled parameters such as seek time, disk utilization, etc.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

Figure 9:
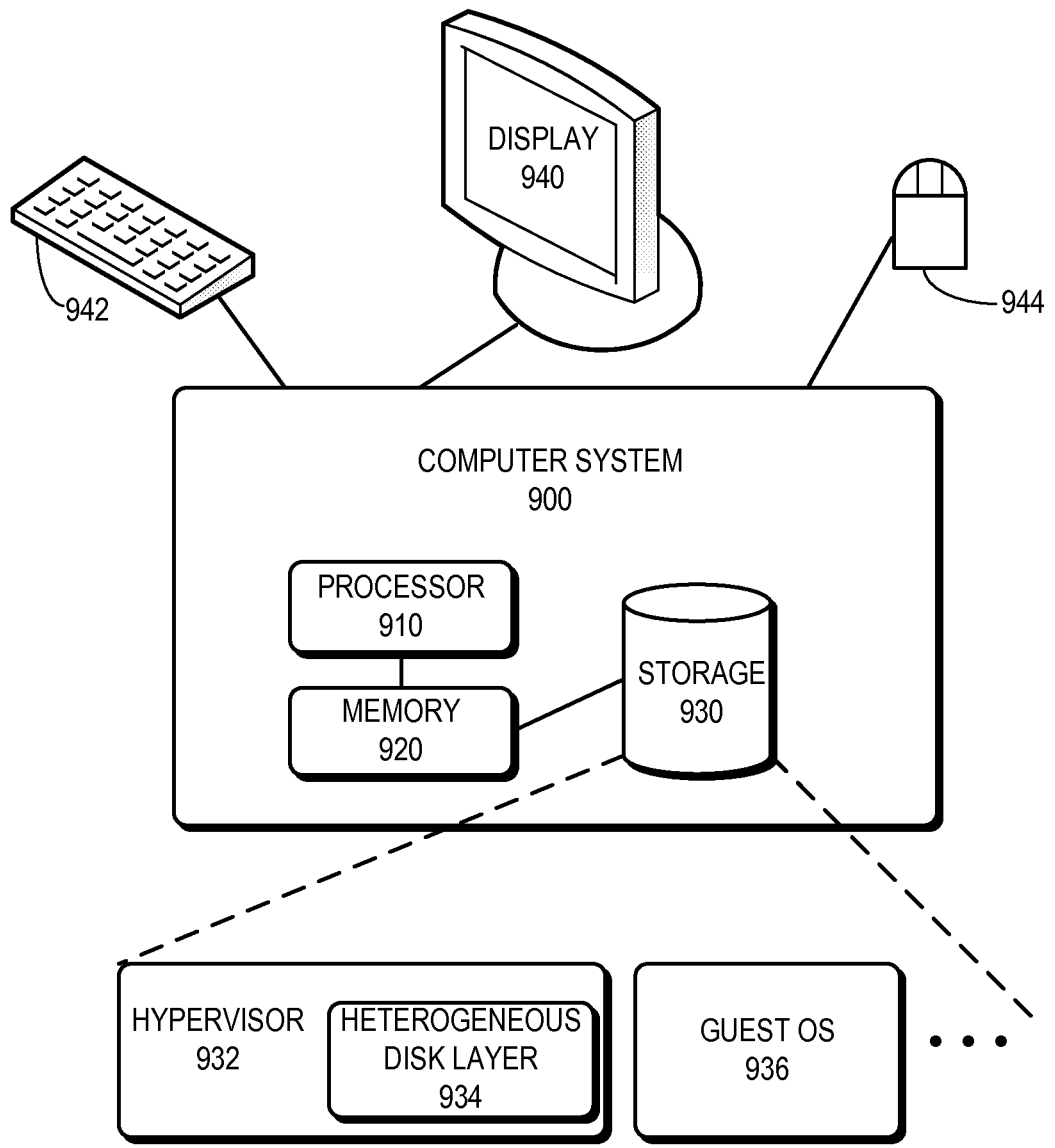
FIG. 9 illustrates an exemplary computer system that facilitates a heterogeneous disk layer.

FIG. 9 illustrates an exemplary computer system that facilitates a heterogeneous disk layer. In this example, a computer system 900 includes a processor 910, a memory 920, and a storage device 930. Memory 920 is coupled to processor 910 and storage device 930. Optionally, computer system 900 also couples to a keyboard 942, a display 940, and a pointing device 944. Storage device 930 stores computer-executable code that implements a hypervisor 932 and a guest OS 936. The instructions for hypervisor 932 also implement a heterogeneous disk layer 934. During operation, an operating system running on computer system 900 loads the instructions stored in storage device 930 into memory 920. Process 910 then executes the instructions stored in memory 920, which in turn implements the virtual disk layer as described above.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for facilitating a virtualized heterogeneous disk system that supports differentiated storage service qualities, the method comprising:
  mounting a plurality of partitions of a heterogeneous disk at different mount points corresponding to different quality of service (QoS) levels in a plurality of QoS levels, wherein the heterogeneous disk is mounted in a guest operating system running in a host computer, and wherein the different mount points include different mount point identifiers that specify one of the different QoS levels;

storing each of the different mount point identifiers in a respective segment of metadata that contains information about a file system formatted on a respective partition in the plurality of partitions;

receiving a file write command for a partition in the plurality of partitions;

converting, by the file system in the guest operating system, the file write command into a block level write command, wherein the mount point identifier is read from the metadata of the partition and is inserted in a field of the block level write command during the converting;

in response to receiving the block level write command, performing:
- identifying, by a hypervisor, the mount point identifier for the partition that is stored in the field of the block level write command;
- determining, by the hypervisor, a first QoS level in the plurality of QoS levels based on the QoS level specified by the mount point identifier;
- selecting, by the hypervisor, a virtualized storage device with performance parameters matching the first QoS level using the heterogeneous disk; and
- writing, by the hypervisor, data to the allocated storage in the selected virtualized storage device.

2. The method of claim 1, wherein the heterogeneous disk is an abstraction of a plurality of virtualized storage devices;
wherein the heterogeneous disk has a single block address space; and
wherein the virtualized storage devices are allowed to have differentiated performance parameters, thereby facilitating the different QoS levels in the heterogeneous disk.

3. The method of claim 2, further comprising maintaining a mapping relationship between a block in the heterogeneous disk and a block in the virtualized storage device.

4. The method of claim 1, wherein:
the block level write command is a SCSI command, and
the field including the mount point identifier is a command descriptor block associated with the block write command.

5. The method of claim 1, further comprising indicating the different mount point identifiers based on the different QoS levels in a superblock of a respective partition.

6. The method of claim 5, wherein identifying the first QoS level comprises:
reading the mount point identifier from the superblock associated with the partition in the file level write command.

7. The method of claim 1, further comprising storing a bit vector which indicates free blocks in a respective partition in a super block of that partition.

8. The method of claim 1, wherein the first QoS level specifies performance parameters that include at least one of:
input/output operations per second;
whether an underlying storage device is protected with redundancy;
availability; and
access time.

9. The method of claim 1, further comprising:
in response to receiving the write command, allocating storage in the selected virtualized storage device for the write command.

10. The method of claim 1, wherein an application executing within the guest operating system selected the partition based on QoS requirements of the application.

11. A non-transitory storage medium storing instructions which when executed by a processor cause the processor to perform a method for facilitating a virtualized heterogeneous disk system that supports differentiated storage service qualities, the method comprising:

mounting a plurality of partitions of a heterogeneous disk at different mount points corresponding to different quality of service (QoS) levels in a plurality of QoS levels, wherein the heterogeneous disk is mounted in a guest operating system running in a host computer, and wherein the different mount points include different mount point identifiers that specify one of the different QoS levels;

storing each of the different mount point identifiers in a respective segment of metadata that contains information about a file system formatted on a respective partition in the plurality of partitions;

receiving a file write command for a partition in the plurality of partitions;

converting, by the file system in the guest operating system, the file write command into a block level write command, wherein the mount point identifier is read from the metadata of the partition and is inserted in a field of the block level write command during the converting;

in response to receiving the block level write command, performing:
- identifying, by a hypervisor, the mount point identifier for the partition that is stored in the field of the block level write command;
- determining, by the hypervisor, a first QoS level in the plurality of QoS levels based on the QoS level specified by the mount point identifier;
- selecting, by the hypervisor, a virtualized storage device with performance parameters matching the first QoS level using the heterogeneous disk; and
- writing, by the hypervisor, data to the allocated storage in the selected virtualized storage device.

12. The non-transitory storage medium of claim 11, wherein the heterogeneous disk is an abstraction of a plurality of virtualized storage devices;
wherein the heterogeneous disk has a single block address space; and
wherein the virtualized storage devices are allowed to have differentiated performance parameters, thereby facilitating the different QoS levels in the heterogeneous disk.

13. The non-transitory storage medium of claim 12, wherein the method further comprises maintaining a mapping relationship between a block in the heterogeneous disk and a block in the virtualized storage device.

14. The non-transitory storage medium of claim 11, wherein:
the block level write command is a SCSI command, and
the field including the mount point identifier is a command descriptor block associated with the block write command.

15. The non-transitory storage medium of claim 11, wherein the method further comprises indicating the different mount point identifiers based on the different QoS levels in a superblock of a respective partition.

16. The non-transitory storage medium of claim 11, wherein the method further comprises storing a bit vector which indicates free blocks in a respective partition in a super block of that partition.

17. The non-transitory storage medium of claim 11, wherein the first QoS level specifies performance parameters that include at least one of:
- input/output operations per second;
- whether an underlying storage device is protected with redundancy;
- availability; and
- access time.

18. A computer system, comprising:
- a processor; and
- a non-transitory storage device coupled to the processor and storing instructions which when executed by the processor cause the processor to perform a method for facilitating a virtualized heterogeneous disk system that supports differentiated storage service qualities, the method comprising:
- mounting a plurality of partitions of a heterogeneous disk at different mount points corresponding to different quality of service (QoS) levels in a plurality of QoS levels, wherein the heterogeneous disk is mounted in a guest operating system running in a host computer, and wherein the different mount points include different mount point identifiers that specify one of the different QoS levels;
- storing each of the different mount point identifiers in a respective segment of metadata that contains information about a file system formatted on a respective partition in the plurality of partitions;
- receiving a file write command for a partition in the plurality of partitions;
- converting, by the file system in the guest operating system, the file write command into a block level write command, wherein the mount point identifier is read from the metadata of the partition and is inserted in a field of the block level write command during the converting;
- in response to receiving the block level write command, performing:
  - identifying, by a hypervisor, the mount point identifier for the partition that is stored in the field of the block level write command;
  - determining, by the hypervisor, a first QoS level in the plurality of QoS levels based on the QoS level specified by the mount point identifier;
  - selecting, by the hypervisor, a virtualized storage device with performance parameters matching the first QoS level using the heterogeneous disk; and
  - writing, by the hypervisor, data to the allocated storage in the selected virtualized storage device.

19. The computer system of claim 18, wherein the heterogeneous disk is an abstraction of a plurality of virtualized storage devices;
- wherein the heterogeneous disk has a single block address space; and
- wherein the virtualized storage devices are allowed to have differentiated performance parameters, thereby facilitating the different QoS levels in the heterogeneous disk.

20. The computer system of claim 19, wherein the method further comprises maintaining a mapping relationship between a block in the heterogeneous disk and a block in the virtualized storage device.

21. The computer system of claim 18, wherein:
- the block level write command is a SCSI command, and
- the field including the mount point identifier is a command descriptor block associated with the block write command.

22. The computer system of claim 18, wherein the method further comprises indicating the different mount point identifiers based on the different QoS levels in a superblock of a respective partition.

23. The computer system of claim 18, wherein the method further comprises storing a bit vector which indicates free blocks in a respective partition in a super block of that partition.

24. The computer system of claim 18, wherein the first QoS level specifies performance parameters that include at least one of:
- input/output operations per second;
- whether an underlying storage device is protected with redundancy;
- availability; and
- access time.

* * * * *